United States Patent [19]

Vincelli et al.

[11] Patent Number: 4,773,960

[45] Date of Patent: Sep. 27, 1988

[54] APPARATUS FOR INSTALLING FAST SETTING INSULATION

[75] Inventors: Alfred J. Vincelli, Palm Harbor; Bradley Alburtus, Valrico, both of Fla.

[73] Assignee: Suncoast Insulation Manufacturing, Co., Palm Harbor, Fla.

[21] Appl. No.: 927,395

[22] Filed: Nov. 6, 1986

[51] Int. Cl.$^4$ .......................... B65G 53/66; B05B 7/06

[52] U.S. Cl. .................................... 156/357; 156/575; 239/9; 406/17; 406/19; 406/48

[58] Field of Search ............. 156/62.2, 71, 284, 308.8, 156/351, 357, 575; 239/8, 9; 406/64, 65, 58, 47, 48, 6, 16, 17, 19

[56] References Cited

U.S. PATENT DOCUMENTS 3,907,170 9/1975 Schedrin ............................... 406/47

4,337,902 7/1982 Markham .............................. 406/48

*Primary Examiner*—Michael W. Ball

*Assistant Examiner*—J. Davis

*Attorney, Agent, or Firm*—Stanley M. Miller

[57] ABSTRACT

An apparatus and method for applying cellulose fiber insulation of the spray on loose fill type. The insulation is coated by a dry and thus deactivated adhesive and is stored in a storage tank. At the moment it exits the storage tanks, the insulation is exposed to and moistened by water sprayed by a nozzle member. The moistened insulation travels the length of a blow hose to reach the application site at the discharge end of the blow tube. The moisture activates the dry adhesive as the insulation travels through the hose, and the turbulence within the hose ensures that all of the fibers are moistened. Thus, by the time the adhesive is discharged by the blow tube, it sets in the absence of dust and virtually no setting time is required because the activated adhesive has begun to set.

9 Claims, 3 Drawing Sheets

APPARATUS FOR INSTALLING FAST SETTING INSULATION

BACKGROUND OF THE INVENTION

1. Field of the invention

This invention relates, generally, to machines and methods for applying the type of insulation that is blown into its operative position, and more specifically relates to a method and apparatus for wetting an adhesive-treated insulation moments before it is applied.

2. Description of the prior art.

There are two common methods of installing insulation.

The first method involves the unrolling of a roll of insulation material so that it overlies the area to be insulated. This type of insulation is known as batt insulation; one of its shortcomings is that it leaves voids between contiguous rolls. Air infiltrates the voids and reduces the "R" value of the insulation.

The second method involves blowing insulation into place; insulation blown into place is referred to in the trade as loose fill insulation. Where a loose fill insulation is applied, the insulation is stored in a storage tank and blown from the storage tank through an elongate hose member to the application area.

Loose fill insulation effectively eliminates the voids associated with batt insulation.

However, it also has limitations. For example, it can be applied only to level surfaces; rooms with cathedral ceilings or other sloped ceilings cannot be effectively insulated with loose fill insulation because it simply collects itself, under the influence of gravity, into a stack at the lowest spot of the sloped area, thereby exposing all the other areas to air infiltration.

Despite its better insulation properties, some contractors are reluctant to use loose fill insulation even in flat areas because its installation is accompanied by the generation of unhealthy, slow-settling dust.

Moreover, loose fill tends to "fluff," i.e., it will collect in some localized areas in thicker piles than it should, thereby wasting insulation.

Many of the problems associated with loose fill have been addressed by inventors. For example, it is known that spray on loose fill insulation which has been moistened will set quickly and in the substantial absence of dust.

It has also been determined that insulation of the cellulose fiber type can be pre-treated with an adhesive which, when moistened, becomes activated and improves the setting properties of the insulation.

More specifically, once the adhesive has been activated, the fibers that collectively form the barrier to heat transfer adhere to one another, thereby reducing setting time and enabling the insulation to be used on sloped surfaces such as the areas over cathedral ceilings and the like.

Accordingly, inventors have devised devices that moisten adhesive-treated spray on loose fill insulation just prior to its application.

The apparatus which represents the state of the art includes a water-spraying nozzle member which is positioned at the discharge end of an elongate blow hose. A garden hose is extended from a municipal water supply and attached to the nozzle member to provide the water to be sprayed by the nozzle.

This apparatus, although in widespread use, has a number of drawbacks. Perhaps the most serious shortcoming is the positioning of the nozzle member; since the nozzle member is positioned at the discharge end of the blow hose, the adhesive carried by the fibers is moistened just a split second before it exits the hose and settles on the area to be insulated.

Thus, loose fill insulation cannot be used on steeply sloped areas because the insulation tends to slide almost as bad as un-treated insulation on such steep slopes. Accordingly, contractors are reluctant to try to cover with insulation surfaces that are sloped as much as forty five degrees, and even lesser angles.

Moreover, a significant amount of insulation simply blows past the nozzle member and escapes the blow hose entirely unmoistened; this insulation raises dust and of course its adhesives are never activated.

Even the fibers that are moistened by the water sprayed by the nozzle are not thoroughly moistened because no means are provided to amply moisten said fibers.

Still another problem arises from the use of a water supply that operates entirely independent of the means that propels the insulation through the blow hose. If the operator forgets to turn the water on, insulation is applied completely dry; the flip side of that situation occurs when the water supplying the nozzle is turned on, but the insulation stops flowing from its storage tank for any number of reasons relating to mechanical failure of the means that draws the insulation out of the tank and propels it through the blow hose and even including the simple emptying of the storage tank.

When the insulation stops flowing but the water remains turned on, the attic of the contractor's customer can be flooded or otherwise subjected to water damage.

Clearly, the art is not fully developed.

If the ideal device were known, insulation with fast hardening adhesives would be applied onto the surface to be covered at virtually the same moment the adhesive begins to set. Thus, the application would take place in the substantial absence of dust and there would be virtually no setting time whatsoever. Nor would unwanted sliding occur where the insulation was being applied to a steeply inclined surface.

Just as importantly, an improved device would include means ensuring that every fiber exiting the blow hose would be thoroughly moistened so that no dry insulation could reach the application area.

The improved device would also include means that would couple together the flow of insulation from the storage tank and the flow of water to the nozzle. This would ensure that no dry insulation would ever be applied, and that the water flow would stop if the insulation flow stopped.

Such a perfected apparatus does not appear in the prior art.

SUMMARY OF THE INVENTION

The present invention provides an apparatus that overcomes the limitations of the devices heretofore invented. It enables loose fill insulation to be applied on surfaces that are inclined as steeply as forty five degrees. It provides for the thorough moistening of every fiber of insulation that exits the blow hose. It ensures that dry adhesive will never be applied, and that water to the nozzle will never flow if the flow of insulation has been interrupted for any reason.

It includes a conventional storage tank for the reception of cellulose (wood-based) fiber insulation.

A feeder box is positioned adjacent an outlet port of the storage tank; insulation pulled from the storage tank by a conventional blowing machine enters the feeder box at its suction side and is discharged therefrom as its discharge side.

A nozzle housing is attached to the discharge end of the feeder box, and a water-spraying nozzle member is positioned within the housing.

An elongate blow hose extends from the discharge end of the nozzle housing and delivers insulation to the application site; thus all insulation blown through the blow tube is wetted by the spray from the nozzle at the moment it begins its trip through the blow hose. The turbulence within the blow hose mixes the fibers with one another and thus ensures that every fiber gets moist. Since the adhesive is wetted as the fibers begin the trip through the hose, ample time elapses to allow the adhesives to begin setting; this enables the insulation to be applied to steep surfaces.

In a first embodiment, the inventive apparatus includes a storage tank for water and a pump that delivers water from the water storage tank to the nozzle; a second embodiment has no storage tank, the nozzle being connected instead to a city water supply.

In both embodiments, the water pump is electrically connected to the blowing machine so that it operates only when the blowing machine operates. This ensures that if insulation is being blown through the blow hose, the water supply will definitley be activated, and, conversely, if the flow of insulation stops, the water flow will stop.

The first embodiment of the invention is used in connection with a gasoline-powered blowing machine whereas the second embodiment employs an electrically powered blowing machine; in all other respects the two embodiments are very similar.

It is an important object of this invention to advance the state of the loose fill insulation art by providing an apparatus that enables loose fill insulation to be applied to very steep surfaces.

It is a closely related object to provide a device that moistens loose fill insulation as it enters a blow hose so that the insulation is thoroughly moistened by the time it exits the blow hose and so that adhesives coating the fibers will have begun to set by said time.

Another object, closely related to the foregoin object, is to advance the state of the loose fill insulation art by providing an apparatus that includes a water-spraying nozzle member positioned at the beginning of the blow hose rather than the end.

Still another object is to eliminate the problems associated with independent connection of the means for controlling the flow of insulation and the flow of the water intended to moisten it.

Another object is to provide an apparatus having utility in connection with gas-powered and electrically-powered blowing machines.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
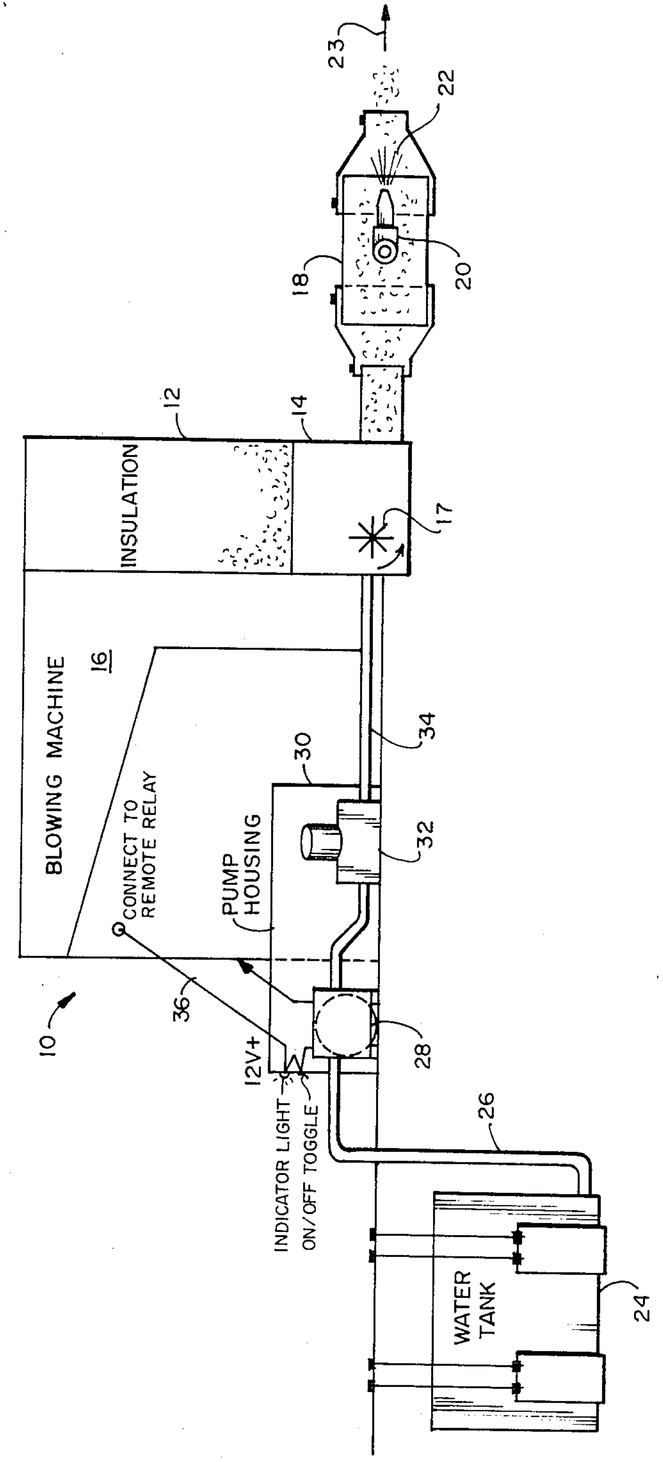
FIG. 1 is a diagram showing the arrangement of parts of the first embodiment of the invention.

Referring now to FIG. 1, it will there be seen that a first illustrative embodiment of the invention is designated by the reference numeral 10 as a whole.

The apparatus 10 includes storage tank 12 which retains the wood-based fiber insulation of this invention; a conventional feeder box 14 is positioned at a discharge opening formed in storage tank 12.

A conventional blowing machine 16 is operative to blow insulation into the feeder box.

A conventional, rotatably-mounted paddle wheel 17 is positioned inside the feeder box; as the paddle wheel rotates, the paddles at the top portion of their cycle pull insulation out of the storage tank and the paddles at the bottom part of their cycle propel insulation through the feeder box to the blow hose in the well known manner.

A nozzle housing 18 is positioned in fluid communication with the discharge side of the feeder box 14.

A full jet spray nozzle 20 is positioned within housing 18 and sprays water 22 in the direction indicated by arrow 23.

In this first embodiment of the invention, water sprayed by nozzle 20 is stored in a 50 gallon storage tank 24 and is pumped to the nozzle via conduit 26 by pump 28 which is housed in pump housing 30.

A conventional strainer 32 positioned on the discharge side of pump 28 filters out large impurities from the water and conduit 34 carries the strained water to nozzle 20.

Advantageously, line 36 electrically interconnects pump 28 and blowing machine 16 so that pump 28 operates only when blowing machine 16 is operating.

A conventional blow hose, not shown in FIG. 1, is connected to the discharge side of the nozzle housing 18 so that the moistened insulation is carried by airstream 23 to the discharge end of the blow tube.

It should therefore be clear that insulation traveling through nozzle housing 18 in the direction of arrow 23 will be moistened as it passes through the stream of water 22 and that, accordingly, by the time the insulation exits the blow hose, the adhesive will have begun to set as sufficient time for such setting will have elapsed.

Moreover, the turbulence of the airflow within the blow hose will assure a thorough mixture of the fibers so that no dry fibers will exit the blow hose.

In a typical application, the blow hose will be approximately one hundred fifty feet (150′) in length. This length is required because the insulation storage tank 12, the blowing machine 16, the water storage tank 24 and other associated parts remain on the truck of the contractor. Since insulation is blown into attics, an elongate blow hose is required if the insulation is to reach its destination.

The insulation used with the present invention is recycled newsprint that has been chemically treated.

Specifically, recycled newsprint is ground through two hammermills, the first having a screen size of one and one-quarter inch ($1\frac{1}{4}$") and the second having a screen size of three-eighths of an inch ($\frac{3}{8}$").

The chemical treatment of the wood-based fiber takes place in the second hammermill.

The fiber is treated in a solution consisting of ammonia sulfate, boric acid, and wheat starch.

The ammonia sulfate and the boric acid are added as fire-retardants, and the wheat starch is added as the adhesive.

The adhesive, since each fiber is thoroughly moistened and since adequate time is provided for the adhesive to begin setting, is operative to prevent the insulation from sliding with respect to an inclined support surface; it has been determined that the adhesive will secure the insulation against sliding on slopes of up to forty five per cent (45%) from the horizontal.

When the insulation is in storage tank 12, the wheat starch is completely dry and is thus in its deactivated state; the adhesive molecules are interstitially positioned within the porous cellulose fiber.

Accordingly, when the fiber passes through nozzle housing 18 and is dampened by water 22 sprayed by nozzle member 20, the adhesive is activated, i.e., the wheat starch (or other suitable adhesive) is brought into solution with the water.

The adhesive is fast setting, however, so that by the time the moist insulation is blown out the discharge end of the blow hose, the adhesive is already beginning to set; thus, it will adhere to inclined slopes even when first deposited thereatop.

Complete setting of the adhesive may take as long as twenty four (24) hours, but as aforesaid the initial setting is sufficient to prevent unwanted sliding of the insulation.

Moreover, the moisture carried by the insulation prevents dust from arising. However, the amount of moisture per molecule of insulation is small so that the amount of water is sufficient to keep the dust down and to activate the adhesive but is not sufficient to wet the area being insulated by any appreciable amount.

More specifically, water is added to the insulation at a rate of about one gallon per each bag of insulation blown through the blow hose. Since a typical residential installation will seldom require more than fifty (50) bags of insulation, the water storage tank is preferably fifty (50) gallons in capacity as aforementioned.

The nozzle sprays about one (1) or two (2) gallons of water per minute.

The embodiment depicted in FIG. 1 employs a DC pump which can operate if supplied with twelve (12) volts. The blowing machine has a twelve (12) volt clutch system so the pump 28 can be interconnected with the power source for the blowing machine. This insures that the pump will operate only when the blowing machine is operated, as aforementioned.

Figure 2:
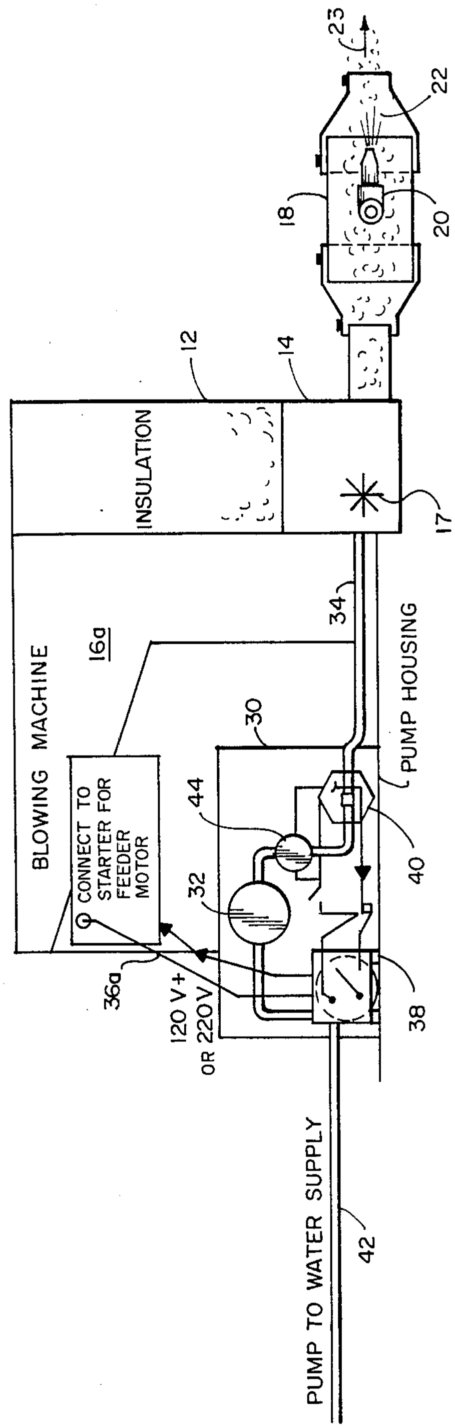
FIG. 2 is a diagram showing the arrangement of parts of the second embodiment of the invention.

The second embodiment of the invention is depicted in FIG. 2; most of the parts are the same as in the embodiment of FIG. 1 and are therefore numbered accordingly.

The first embodiment would normally be used in connection with the insulation of a residence. The second embodiment would normally be used in connection with the insulation of a larger, commercial establishment.

In commercial applications, it is customary to use electric-powered blowing machines that operate at either one hundred twenty (120) or two hundred twenty (220) volts AC.

Therefore, the voltage on line **36*a* that interconnects the electrically-powered blowing machine 16*a* and pump 28** must be stepped down to twelve (12) volts and the current must be rectified from AC to DC.

A step down transformer 38 and a rectifier 40 are thus provided.

Also, since larger quantities of insulation are used in commercial settings, the 50 gallon water storage tank of the residential embodiment of the invention is replaced by conduit 42 which is connected to a municipal or other inexhaustible water supply.

A solenoid valve 44 is added to shut off the flow of water in conduit 42 whenever the blowing machine **16*a* is deactivated; importantly, the solenoid valve 44** and the blowing machine are electrically interconnected so that an interruption of power to the blowing machine is operative to close the solenoid valve so that water cannot continue to flow in the absence of insulation flow.

In all other respects, as aforesaid, the embodiments of FIGS. 1 and 2 are the same.

Figure 3A:
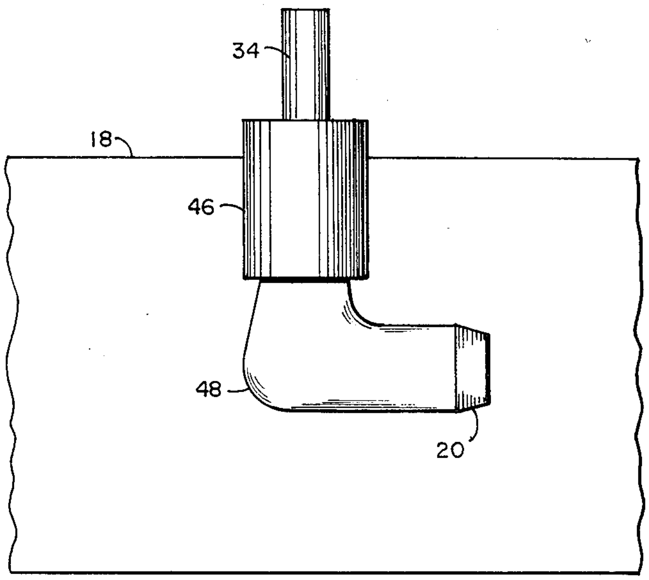
FIG. 3A is a side elevational view of the nozzle housing and nozzle member used with both embodiments of the invention.
Figure 3B:
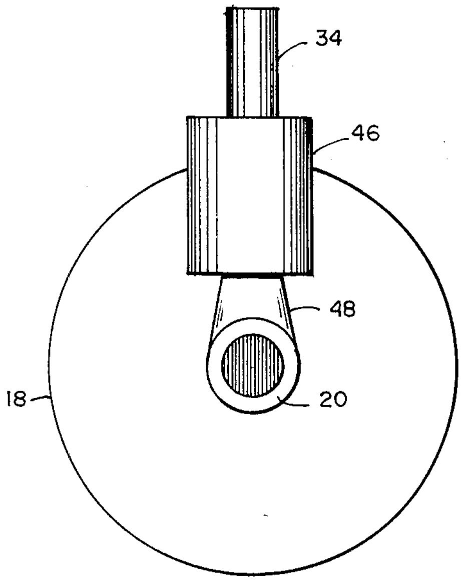
FIG. 3B is an end view of the housing and nozzle member of FIG. 3A.

Nozzle 20 and its housing 18 are shown in more detail in FIGS. 3A and 3B.

It will there be noted that nozzle housing 18 is provided in the form of a four inch (4") in diameter tubing.

Conduit 34 carrying water exiting strainer 32 terminates in a pipe coupler 46 that extends through an aperture formed in the top of housing 18. An elbow joint 48 directs the water to nozzle 20 which is a full jet spray nozzle as aforesaid.

As is perhaps best understood in connection with FIG. 3B, the diameter of nozzle housing 18 is such that the required volume of insulation can easily pass therethrough, nozzle 20 and its associated parts representing no significant impediment to the flow of the insulation.

Nozzle 20 and housing 18 are the same in both embodiments, and the nozzle is operative to moisten the insulation passing through housing 18 whether the same is blown therethrough by an electrically-powered commercial blowing machine or a gas-powered residential blowing machine, of course.

The resulting insulation thus combines the best properties of batt and loose fill insulation.

It goes on without dust and thus mimics a desireable property of batt insulation. It goes on in the form of a spray on loose fill, however, and thus provides the better insulating properties of loose fill insulation.

Most importantly, due to the quick setting of the adhesive, it can be used in inclined areas formerly incapable of being insulated with loose fill insulation.

Both embodiments of the invention thus represent an important advance in the art.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An apparatus that delivers moistened, adhesive-carrying loose fill type insulation to an area to be covered, comprising:

a storage tank for the retention of insulation:

an adhesive in deactivated form being adhered to the insulation in said storage tank;

a feeder box positioned at an outlet port of said storage tank;

a nozzle housing positioned at a discharge end of said feeder box;

a water-spraying nozzle means positioned within said nozzle housing;

a source of water under pressure;

a conduit means for supplying said water under pressure to said nozzle means;

a blowing machine for blowing insulation out of said storage tank and through said feeder box;

said nozzle means specifically positioned to spray water in the same direction as insulation is blown by said blowing machine;

an elongate blow hose having a first end connected to a discharge end of said nozzle housing and having a second end positioned at the area to be covered by insulation;

said water sprayed by said nozzle means being in sufficient quantity to moisten and thus activate the adhesive adhered to said insulation as said insulation passes said nozzle means and is wetted by the water sprayed therefrom;

said insulation being mixed by turbulence as it travels the length of said blow hose so that it is thoroughly moistened by the time it is discharged from said blow hose;

a switch means operative to interrupt the flow of water under pressure through said conduit means in the event said blowing machine is deactivated;

said source of water under pressure being a substantially inexhaustible supply of water from a water system, and wherein a solenoid means operative to open and close said conduit means is provided and is electrically coupled to said blowing machine so that deactivation of said blowing machine is operative to close said solenoid means and thus is operative to terminate flow of water under pressure through said conduit means;

whereby insulation blown to said area to be covered arrives at said area in a moist condition so that the moisture prevents dust from arising and so that the activated adhesive will be setting at the time said insulation is discharged from said blow hose, which setting causes said insulation to adhere to itself and to the area to be covered to the end that the insulation may be delivered to an inclined area and deposited thereatop in the substantial absence of sliding.

2. The apparatus of claim 1, wherein the adhesive is wheat starch.

3. The apparatus of claim 1, wherein said insulation is pre-treated by adding to it fire retardants and adhesives.

4. The apparatus of claim 3, wherein the fire retardants are ammonia sulfate and boric acid.

5. The apparatus of claim 1, wherein about one gallon of water is sprayed by said nozzle means for each bag of insulation passing through said nozzle housing.

6. The apparatus of claim 1, wherein said nozzle means sprays water at a rate of about 1-2 gallons per minute.

7. The apparatus of claim 1, wherein said nozzle means is a full jet spray nozzle member.

8. The apparatus of claim 1, wherein said nozzle housing is a tubular member.

9. The apparatus of claim 1, wherein said nozzle means is positioned at the center of said nozzle housing and is specifically positioned to spray water in the same direction that insulation flows past said nozzle means.

* * * * *